United States Patent
Hamura et al.

(10) Patent No.: US 6,914,697 B2
(45) Date of Patent: Jul. 5, 2005

(54) PRINTING METHOD AND APPARATUS FOR SEPARATELY PROCESSING A PLURALITY OF PRINT DATA

(75) Inventors: Shigeki Hamura, Kawasaki (JP); Tsuyoshi Takahashi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/138,378

(22) Filed: Aug. 24, 1998

(65) Prior Publication Data

US 2002/0001101 A1 Jan. 3, 2002

(30) Foreign Application Priority Data

Nov. 4, 1997 (JP) .............................................. 9-301897

(51) Int. Cl.⁷ .............................................. G06F 15/00
(52) U.S. Cl. ..................... 358/1.17; 358/1.15
(58) Field of Search .......................... 358/1.1, 1.7, 1.9, 358/1.15, 1.17, 1.18, 402, 474, 1.3, 1.13, 1.14, 1.16, 500, 501, 524, 530, 540, 401, 448, 462; 382/165, 171, 176, 209, 302, 304, 303; 345/113, 115, 418, 433, 435, 501, 502, 504, 505, 506, 512

(56) References Cited

U.S. PATENT DOCUMENTS

| | | | |
|---|---|---|---|
| 5,067,024 A | * 11/1991 | Anzai | 358/296 |
| 5,157,765 A | 10/1992 | Birk et al. | 345/506 |
| 5,179,637 A | * 1/1993 | Nardozzi | 358/1.15 |
| 5,333,246 A | * 7/1994 | Nagasaka | 345/433 |
| 5,499,110 A | * 3/1996 | Hosogai | 358/450 |
| 5,774,638 A | * 6/1998 | Kageyama et al. | 358/1.15 |
| RE35,922 E | * 10/1998 | Cuzzo et al. | 395/1.14 |
| 5,835,630 A | * 11/1998 | Schweid et al. | 382/173 |
| 5,850,504 A | * 12/1998 | Cooper et al. | 358/1.18 |
| 5,937,153 A | * 8/1999 | Gauthier | 358/1.18 |
| 6,002,848 A | * 12/1999 | Takahashi | 358/1.17 |

FOREIGN PATENT DOCUMENTS

| | | |
|---|---|---|
| EP | 0585074 A2 | 3/1994 |
| EP | 0678826 A2 | 10/1995 |
| JP | 60-141573 | 7/1985 |
| JP | 1-170263 | 7/1989 |
| JP | 01-301272 | 12/1989 |
| JP | 2-1097 | 1/1990 |
| JP | 03-113691 | 5/1991 |
| JP | 04-001068 | 1/1992 |
| JP | 04-022267 | 1/1992 |
| JP | 7-322165 | 12/1995 |
| JP | 09-039304 | 2/1997 |
| JP | 09-123541 | 5/1997 |

OTHER PUBLICATIONS

Notice of Reason for Rejection for related Japanese Application No. 9–301897 mailed Jun. 11, 2002.
EP Search Report dated Feb. 19, 2003 for corresponding EP Application No. 98402168.

* cited by examiner

Primary Examiner—Gabriel Garcia
(74) Attorney, Agent, or Firm—Staas & Halsey LLP

(57) ABSTRACT

The present invention provides a printer capable of separately processing a plurality of print data corresponding to an image to be printed on the same page, each of the print data having an attribute, in accordance with the attribute. The printer has an image, a plurality of video interfaces, a print data integration circuit, and an output mechanism. The image buffer stores each of the print data in accordance with the attribute. Each of the video interfaces reads each of the print data stored in the image buffer. The print data integration circuit integrates the plurality of print data read by the video interfaces into a piece of print data for the same page. The output mechanism outputs the image of the same page based on the print data integrated by the print data integration circuit. Therefore, the plurality of print data can be separately processed and output in accordance with the attribute.

10 Claims, 12 Drawing Sheets

PRINTING METHOD AND APPARATUS FOR SEPARATELY PROCESSING A PLURALITY OF PRINT DATA

BACKGROUND OF THE INVENTION

1. Field of the Invention

The present invention relates to a printer printing an image corresponding to print data output from a computer.

2. Description of the Related Art

Conventionally, there is a printer, which is provided with an image buffer stored with print data output from a computer, and prints data by transferring the print data stored in this image buffer to a print mechanism in sequence.

FIG. 12 shows a control circuit in such a conventional printer. As shown in FIG. 12, the control circuit in the conventional printer is provided with a communication interface 20, a MPU (micro processing unit) 21, an image buffer 22, a VIF (video interface) 23, an image processing circuit 24, and a print mechanism 25, each connected to one another through a control bus B1. Further, the communication interface 20, the MPU 21, the image buffer 22 and the VIF 23 are connected to one another through a data bus B2.

The MPU 21 is a processing unit controlling an action of each circuit block through the control bus B1.

The communication interface 20 receives the print data transmitted from a host computer (not shown), and transmits the print data to the data bus B2. This print data is transmitted from the computer (or server), and includes character codes, image dot data, printer setting data, commands and the like.

The image buffer 22 is a memory temporarily storing the print data individually transmitted to the data bus B2 from the communication interface 20 in accordance with the control of the MPU 21.

The VIF 23 reads one piece of print data stored in the image buffer 22, and outputs the print data read to the image processing circuit 24 as an image signal which is data from the printer, namely, a video signal, in accordance with the control of the MPU 21. The VIF 23 receives a synchronous signal from the print mechanism 25 when outputting the image signal to the image processing circuit 24, and outputs the image signal in synchronism with this synchronous signal. Further, when the VIF 23 reads a new piece of print data, it is necessary for the MPU 21 to set an address and so on concerning the print data to be read in the image buffer 22.

The image processing circuit 24 applies various image processes set by the MPU 21 to the image signal output from the VIF 23, and then outputs the image signal to the print mechanism 25.

The print mechanism 25, based on the image signal received from the image processing circuit 24, prints an image corresponding to this image signal. The print mechanism 25 gives the synchronous signal to the VIF 23.

As described above, the control circuit in the conventional printer is provided with only one set of the VIF 23 and the image processing circuit 24. Therefore, there are three problems as follows.

The first problem in the conventional printer is explained. Since the control circuit in the conventional printer is provided with only one VIF 23, only an image corresponding to one piece of print data can be printed concerning one page. For example, to print text (data) in a prescribed form, when print data corresponding to the text and print data corresponding to the prescribed form are transmitted from the host computer, the MPU 21 previously integrates two pieces of print data into one piece of print data with a software process, and then stores it in the image buffer 22. In this way, the VIF 23 is capable of printing the text (data) on the prescribed form only by reading one piece of integrated print data from the image buffer 22. However, there is a problem in that the printer operates slowly because the integration process of print data gives a big load to the MPU 21.

The second problem in the conventional printer is explained. Since the control circuit in the conventional printer is provided with only one VIF 23, this VIF 23 must read all of the print data. For example, in a case of a printer having a buffer memory of which capacity is smaller than one page and performing band printing, the VIF 23 must read all bands of print data in sequence transmitted from the host computer. Then, the VIF 23 must be reset by the MPU 21 in order to read a new piece of band print data. During the resetting, the VIF 23 must stop. Accordingly, there is a problem in that the image printed by the print mechanism 25 breaks off when a time necessary to reset the VIF 23 exceeds an allowed time (a time necessary to output all picture signals in a buffer in the VIF 23).

The third problem in the conventional printer is explained. Since the control circuit in the conventional printer is provided with only one image processing circuit 24, one kind of image process concerning one page is able to be executed. However, in a case in which the print data includes text data and image data, it is desirable that an image processing suitable to the text data be applied to the text data while it is desirable that an image processing suitable to image data be applied to the image data. For example, it is desirable to apply the smoothing process to the text data while it is desirable to apply the intermediate tone process to the image data. Further, concerning the resolution of the image, in order to execute high-speed printing, it is desirable to apply the low-resolution process to the text data, while it is desirable to apply the high resolution process to the image data. Moreover, concerning data compression/decompression, it is desirable that, as to the text data, the run-length compression is executed in the host computer and then the run-length decompression is executed in the image processing circuit 24, while it is desirable that, as to the image data, the LZ compression is executed in the host computer and then the LZ decompression is executed in the image processing circuit 24. In spite of such a request for the control circuit in the conventional printer, there is a problem in that only one image process suitable to text data or image data is applied to the print data since there is only one image processing circuit 24.

SUMMARY OF THE INVENTION

Accordingly, it is an object of the present invention to solve the problems in the conventional printer, and to provide a printer capable of individually processing a plurality of print data corresponding to parts of an image to be printed on one page and capable of printing the image on one page based on these print data.

To solve the above-mentioned problems, the present invention introduces the following aspects.

That is, the first aspect according to the present invention is a printer outputting a plurality of print data corresponding to an image to be printed on a same page, each of the print data having an attribute. The printer is provided with an image buffer storing each of the print data in accordance with the attribute, a plurality of video interfaces, each of the video interfaces reading each of the print data stored in the image buffer, a print data integration circuit integrating the plurality of print data read by the video interfaces into a piece of print data for the same page, and an output mechanism outputting the image of the same page based on the print data integrated by the print data integration circuit.

With this arrangement, the image buffer stores a plurality of print data to be printed on the same page in accordance with the attribute. Each video interface reads one of the print data stored in the image buffer independently of another video interface. Accordingly, it is possible to apply a peculiar process to each of the print data read by each video interface. Then, these print data are integrated by the print data integration circuit. The output mechanism outputs the image on the same page based on the print data integrated by the print data integration circuit.

A printer of the second aspect is specified in that the plurality of print data stored in the image buffer contain form print data corresponding to a form and text print data corresponding to a text to be printed over the form.

A printer of the third aspect, in addition to the first aspect, comprises a separation unit for separating print data corresponding to an image with text into print data corresponding to the image and print data corresponding to the text, and a storage unit for storing each of the print data separated by the separation unit in the image buffer in accordance with the attribute.

A printer of the fourth aspect, in addition to the third aspect, further comprises a plurality of image processing circuits, each of the image processing circuits applying each image process to each of the print data read by each of the video interfaces.

A printer of the fifth aspect is specified in that the plurality of print data stored in the image buffer are obtained by dividing print data corresponding to the image to be printed on the same page into a plurality of bands, and wherein the print data integration circuit repeatedly selects each of the print data read by each of the video interfaces and outputs selected print data to the output mechanism.

The present invention may be a controller controlling a plurality of print data, each of the print data having an attribute. The controller is provided with a plurality of video interfaces, each of the video interfaces reading each of the print data stored in the image buffer storing each of the print data in accordance with the attribute, and a print data integration circuit integrating the plurality of print data read by the video interfaces into a piece of print data for the same page.

DETAILED DESCRIPTION OF THE PREFERRED EMBODIMENT

Hereinafter, concrete explanations are given of embodiments of the present invention with reference to the drawings.

First, an explanation will be given of a control circuit in a printer according to an embodiment of the present invention.

Figure 1:
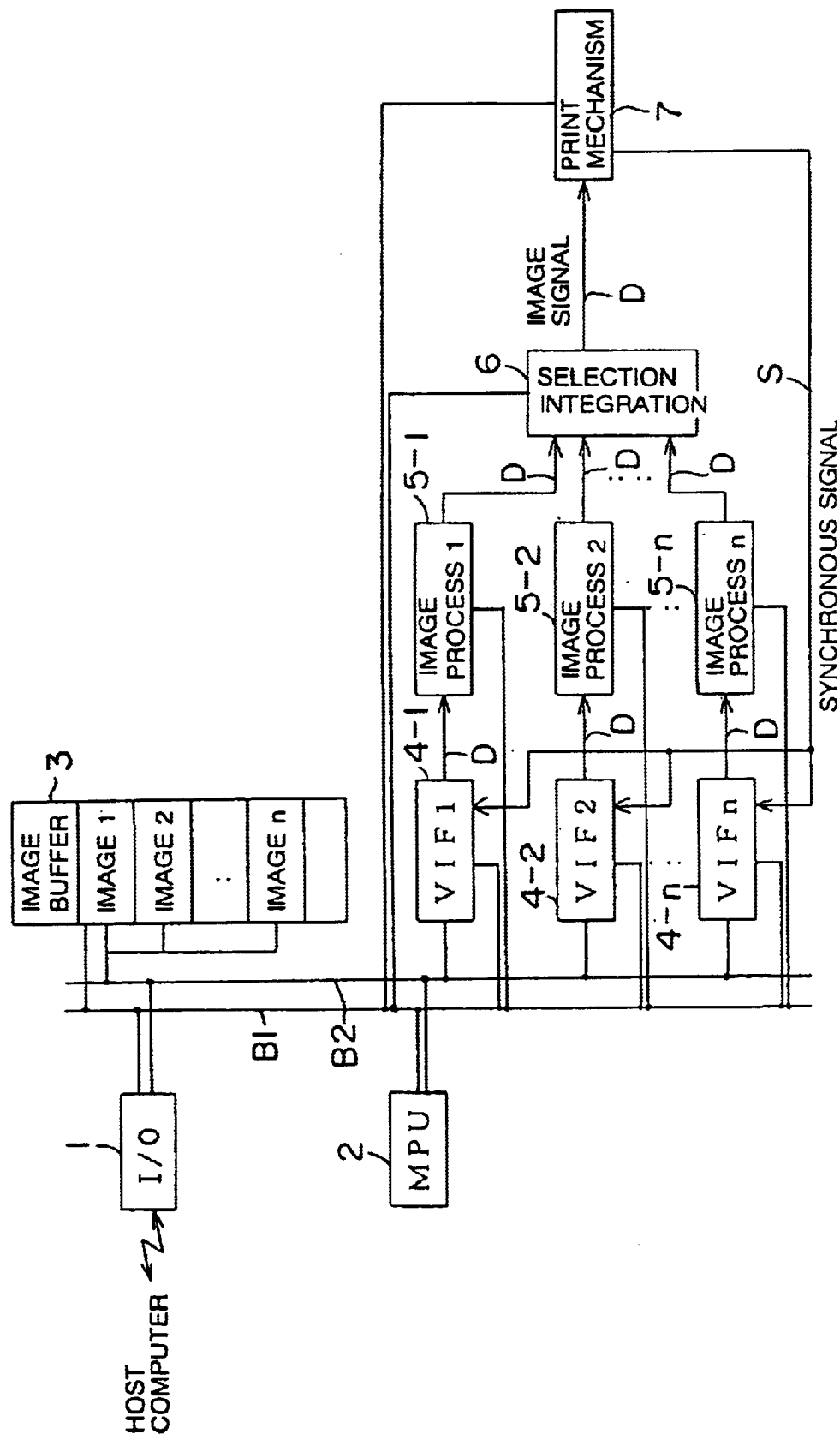
FIG. 1 is a block diagram showing a configuration of a control circuit in a printer according to an embodiment of the present invention.

FIG. 1 is a block diagram showing the control circuit in the printer according to the embodiment of the present invention. As shown in FIG. 1, the control circuit of the printer according to this embodiment is provided with a communication interface 1, a MPU (micro processing unit) 2, an image buffer 3, first through nth VIFs (video interface) 4-1 through 4-$n$, first through n-th image processing circuits 5-1 through 5-$n$, a selection integration circuit 6, and a print mechanism 7, each connected through a control bus B1 to one another. Further, the communication interface 1, the MPU 2, the image buffer 3, and each of the VIFs 4-1 through 4-$n$ are connected to one another through a data bus B2. The first VIF 4-1 is connected with the image processing circuit 5-1 through a data line D, and the second VIF 4-2 is connected to the image processing circuit 5-2 through a data line D. Similarly, the n-th VIF 4-$n$ is connected to the n-th image processing circuit 5-$n$ through a data line D. Each of the image processing circuits 5-1 through 5-$n$ is also connected to the selection integration circuit 6 through a data line D. The selection integration circuit 6 is also connected to the print mechanism 7 through a data line D. The print mechanism 7 is connected to each of the VIFs 4-1 through 4-$n$ through a signal line S.

The communication interface 1 receives print data transmitted from a host computer (not shown), and transmits the print data to the data bus B2. This print data is transmitted from the computer (or server), and includes character codes, image dot data, printer setting data, commands and the like.

The MPU 2 is a central processing unit controlling an action of each circuit through the control bus B1. Concretely, the MPU 2 transmits an address and a command to each circuit in the printer through the control bus B1, thereby storing the print data transmitted to the data bus B2 by the communication interface 1 into one of the storage areas "image 1", through "image n" of a predetermined address in the image buffer 3, setting each of the VIFs 4-1 through 4-$n$, setting description of image processing to be executed by each of the image processing circuits 5-1 through 5-$n$, setting whether the selection integration circuit 6 should execute the selection action or the integration action, and instructing a printing start to the print mechanism 7. Incidentally, the selection integration circuit 6 executes three functions such as image data selection, image data integration and a combination of data selection and integration. The MPU 2 instructs the selection integration circuit 6 to execute one function among these three functions.

Further, when print data transmitted to the data bus B2 by the communication interface 1 includes text data and image data, the host computer generates this print data so as to be distinguished between text data and image data, that is, so as to be distinguished based on the attribute. Thus, the MPU 2 divides this print data into text data and image data (corresponding to a separation unit), and stores the divided pieces of data in the image buffer 3 independently (corresponding to a storage unit).

The image buffer 3 is a memory temporarily storing each print data transmitted into the data bus B2 by the communication interface 1 or the MPU 2 in a position corresponding to an address appointed by the MPU 2 through the control bus B1.

Each of the VIFs 4-1 through 4-n is instructed by the MPU 21 through the control bus B1, and reads print data from the position of the address appointed by this instruction in the image buffer 3. Then, each of the VIFs 4-1 through 4-n outputs the print data read as an image signal to each of the image processing circuits 5-1 through 5-n, respectively Each of the VIFs 4-1 through 4-n, when outputting the image signal to each of the image processing circuits 5-1 through 5-n, receives a synchronous signal from the print mechanism 7 and outputs image signals for several lines in synchronism with the synchronous signal.

Each of the image processing circuits 5-1 through 5-n applies various image processes instructed by the MPU 2 to the image signal output from one of the VIFs 4-1 through 4-n, respectively, and then outputs the image signal to the print mechanism 25. As the image process capable of being executed by each of the image processing circuits 5-1 through 5-n, there are the smoothing process for text data (a process making notches at peripheries of a bit map font constituting characters into smooth slanted lines or curves), the intermediate tone process for image data (a process smoothing variation of light and shade in the image), the low-resolution process for text data (a process reducing a number of dots constituting a character), the high-resolution process for image data (a process making pixels constituting image fine), the run-length decompression process for the runlength compressed text data, and the LZ decompression process for the LZ compressed image data.

The selection integration circuit 6 as a print data integration unit, when a selection action is instructed by the MPU 2 through the control bus B1, selects an image signal from one image processing circuit 5 appointed by the MPU 2 and transmits it to the print mechanism 7, and when transmission of the image signal from this image processing circuit 5 terminates, selects an image signal from another image processing circuit 5 appointed by the MPU 2 and transmits it to the print mechanism 7. In this way, when the selection action is instructed, the selection integration circuit 6 selects image signals from two image processing circuits 5 appointed by the MPU 2, integrates them as an image signal (print data) for one page, and transmits this image signal to the print mechanism 7. Further, the selection integration circuit 6, when an integration action is instructed by the MPU 2 through the control bus B1, integrates image signals from a plurality of image processing circuits 5 appointed by the MPU 2 into one image signal so as to integrate them into print data for one page, and transmits this image signal to the print mechanism 7.

The print mechanism 7, based on the image signal received from the selection integration circuit 6, prints an image corresponding to this image signal on a sheet of paper. The print mechanism 7 gives synchronous signals to all VIFs 4-1 through 4-n outputting image signals selected or integrated by the selection integration circuit 6.

Next, explanations will be given of controls (that is, actions of the printer) actually executed by the MPU 2 for every kind of print data transmitted from the host computer (not shown) as operational examples 1 through 5.

OPERATIONAL EXAMPLE 1

The operational example 1 shows a control process (action of the printer) executed when print data for printing an image of a text (hereinafter, called "text print data") and print data for printing an image of a form (hereinafter, called "form print data") are transmitted from the host computer (not shown) to execute form printing (overlay printing).

Figure 2:
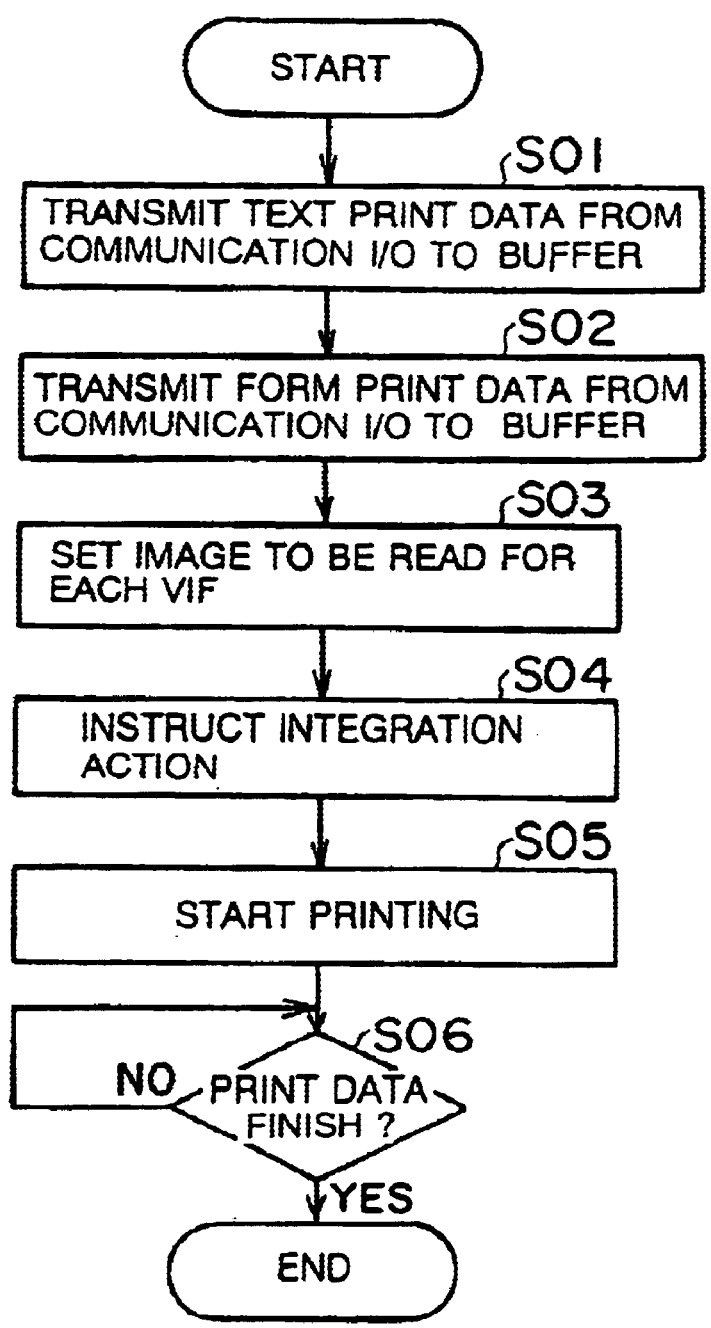
FIG. 2 is a flowchart showing a control process executed by the MPU 2 in Operational Example 1.
Figure 3:
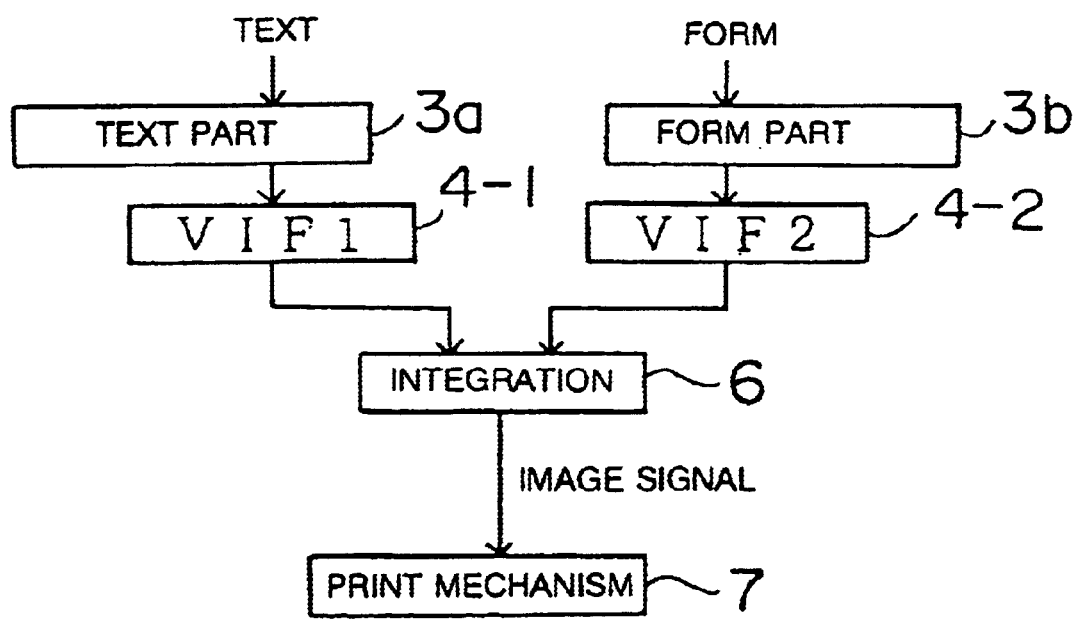
FIG. 3 is an explanatory view showing an operation of a printer in Operational Example 1.

FIG. 2 is a flowchart showing this control process, and FIG. 3 is an explanatory view showing an action in the printer when the MPU 2 executes the control process according to this flowchart.

The flowchart in FIG. 2 starts with the communication interface 1 receiving print data transmitted from the host computer (not shown). After starting, the MPU 2 transmits the text print data (code or image data) to the image buffer 3 from the communication interface 1 (SO1), and transmits the image print data to the image buffer 3 from the communication interface 1 (S02). At this time the MPU 2, as shown in FIG. 3, stores the text print data in a position 3a indicated by the first address in the image buffer 3 (hereinafter, called "the first address position"), and stores the form print data in a position 3b indicated by the second address in the image buffer 3 (hereinafter, called "the second address position"). The order of SO1 and S02 may be reversed.

At S03, the MPU 2 instructs the first VIF 4-1 to read print data from the first address position 3a in the image buffer 3 and instructs the second VIF 4-2 to read print data from the second address position 3b in the image buffer 3.

At S04, the MPU 2 instructs the selection integration circuit 6 to execute the integration action.

At S05, the MPU 2 instructs the first and second VIFs 4-1 and 4-2, the first and second image processing circuits 5-1 and 5-2, the selection integration circuit 6, and the print mechanism 7 to start printing. The first VIF 4-1, when receiving the instruction, reads the text print data from the first address position in the image buffer 3 and transmits image signals for several lines to the selection integration circuit 6 through the first image process circuit 5-1. At the same time, the second VIF 4-2 reads the form print data from the second address 3b in the image buffer 3 and transmits image signals for several lines to the selection integration circuit 6 through the second image process circuit 5-2. The selection integration circuit 6 integrates the image signals received through the first and second image processing circuits 5-1 through 5-2, and transmits the integrated image signal to the print mechanism 7. The print mechanism 7 prints the image corresponding to the image signal received from the selection integration circuit 6 on a sheet of paper. After this printing, the print mechanism 7 transmits the synchronous signal to both the first and second VIFs 4-1 and 4-2. The first and second VIFs 4-1 and 4-2, which receive this synchronous signal, transmit image signals to the selection integration circuit 6 as long as there is an image signal not yet transmitted.

At S06, the MPU 2 waits until the first and the second VIFs 4-1 and 4-2 transmit all image signals corresponding to print data (that is, until the print mechanism 7 finishes the printing). When transmission of all image signals corresponding to print data is finished (that is, when printing by the print mechanism 7 is finished), the MPU 2 terminates this control process.

In this way, according to the operational example 1, not the software process in the MPU 2, but the hardware action in the selection integration circuit 6 integrates text data and form data for the form printing. Accordingly, there is no need of a time required to integrate text print data and form print data by the MPU 2; therefore, the printing by the print mechanism 7 is executed in real time as to transmission of print data from the host computer.

OPERATIONAL EXAMPLE 2

The operational example 2 shows the control process (action of a printer) executed in order to execute printing when print data including text data and image data are transmitted.

Figure 4:
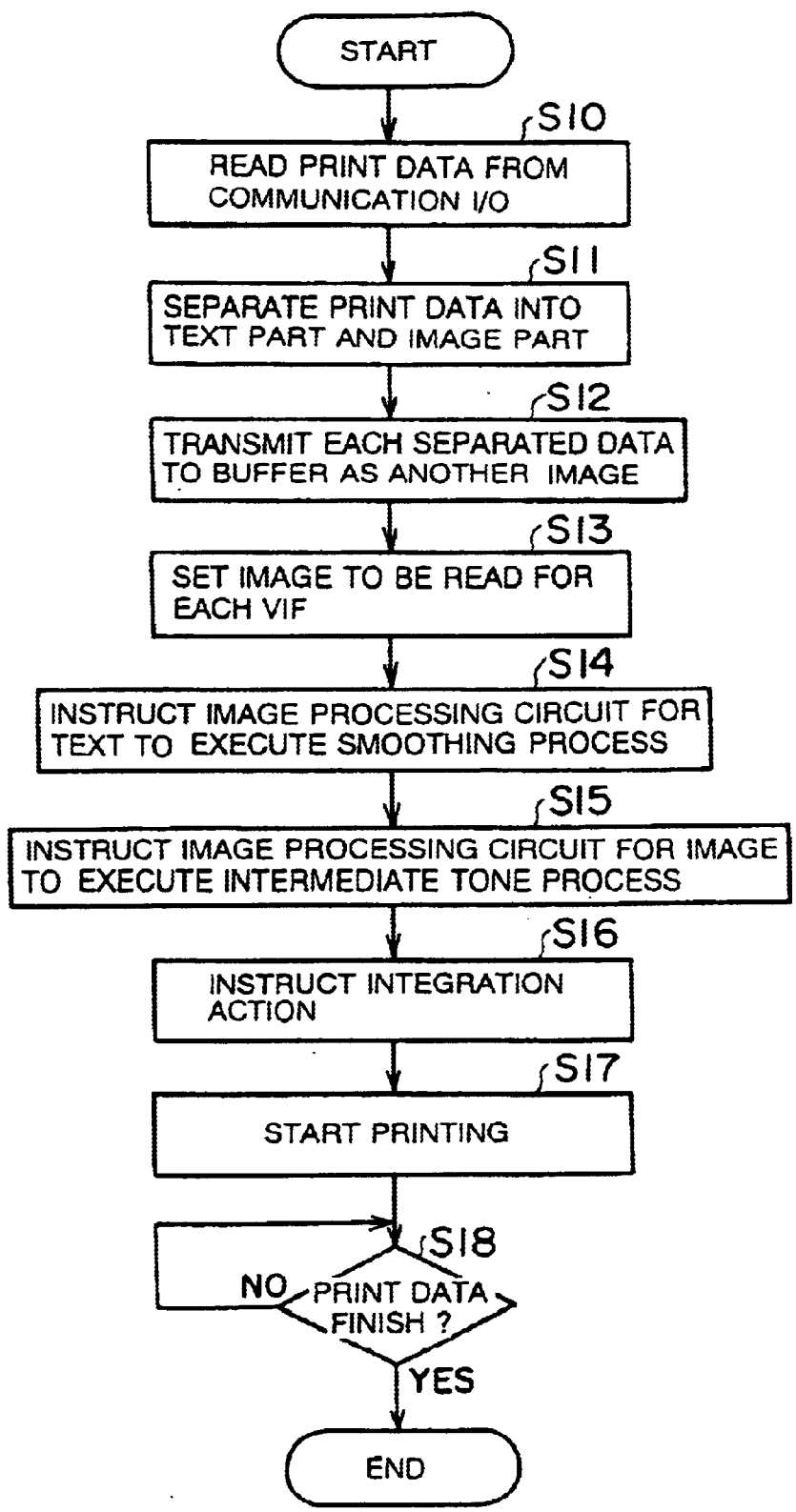
FIG. 4 is a flowchart showing a control process executed by the MPU 2 in Operational Example 2.
Figure 5:
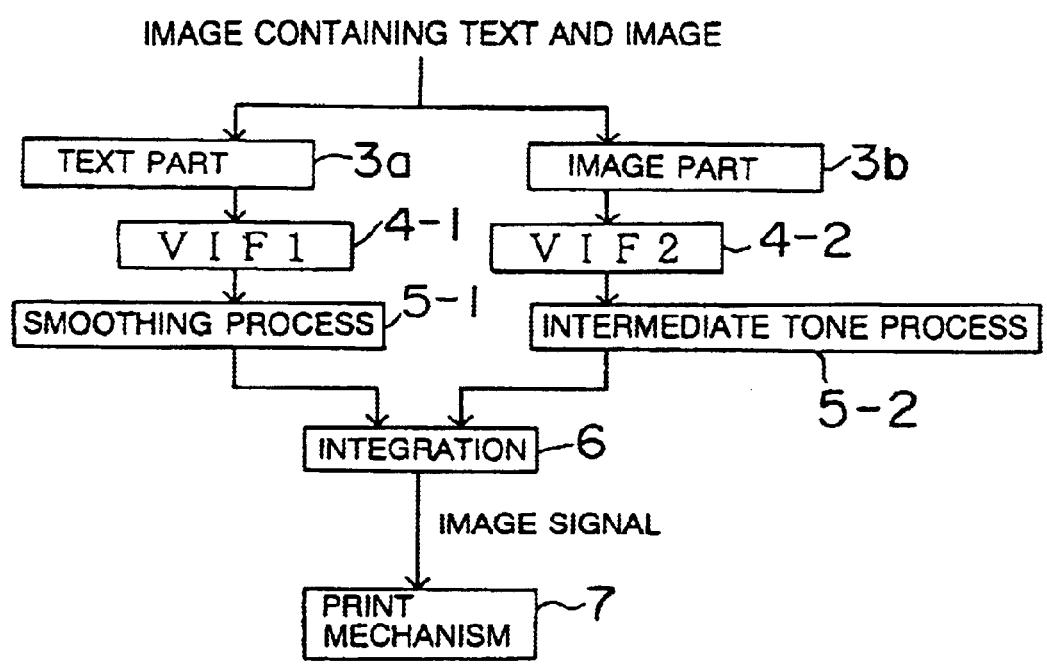
FIG. 5 is an explanatory view showing an operation of a printer in Operational Example 2.

FIG. 4 is a flowchart showing this control process, and FIG. 5 is an explanatory view showing an action in the printer when the MPU 2 executes the control process according to this flowchart.

The flowchart in FIG. 4 starts with the communication interface 1 receiving print data transmitted from the host computer (not shown). At S10, after starting, the MPU 2 reads the print data from the communication interface 1.

At S11, the MPU 2 divides the print data read into print data corresponding to a text part (hereinafter, called "text print data") and print data corresponding to an image part (hereinafter, called "image print data") based on the attribute shown in the print data transmitted from the computer (equivalent to a separation unit).

At S12, the MPU 2 transmits the text print data and the image print data to the image buffer 3. At that time, the MPU 2, as shown in FIG. 5, stores the text print data in a position 3a indicated by the first address in the image buffer 3 (hereinafter, called "the first address position") and stores the image print data in a position 3b indicated by the second address in the image buffer 3 (hereinafter, called "the second address position") (equivalent to a storage unit).

At S13, the MPU 2 instructs the VIF 4-1 to read print data from the first address position 3a in the image buffer 3, and instructs the second VIF 4-2 to read print data from the second address position 3b in the image buffer 3.

At S14, the MPU 2 instructs the first image processing circuit 5-1 for the text part to execute the smoothing process.

At S15, the MPU 2 instructs the second image processing circuit 5-2 for the image part to execute the intermediate tone process.

At S16, the MPU 2 instructs the selection integration circuit 6 to execute the integration action.

At S17, the MPU 2 instructs the first and second VIFs 4-1 and 4-2, the first and second image processing circuits 5-1 and 5-2, the selection integration circuit 6, and the print mechanism 7 to start the printing. The first VIF 4-1, when receiving this instruction, reads the text print data from the first address position 3a in the image buffer 3 and transmits image signals for several lines to the first image processing circuit 5-1. At the same time, the second VIF 4-2 reads the image print data from the second address position 3b in the image buffer 3 and transmits image signals for several lines to the second image processing circuit 5-2. The first image processing circuit 5-1, which receives the image signals, transmits them to the selection integration circuit 6 after applying the smoothing process to the image signals. The second image processing circuit 5-2, which receives the image signals, transmits them to the selection integration circuit 6 after applying the intermediate tone process to the image signals. The selection integration circuit 6 integrates image signals received from the first and second image processing circuits 5-1 and 5-2 and transmits the integrated image signal to the print mechanism 7. The print mechanism 7 prints the image corresponding to the image signal received from the selection integration circuit 6 on a sheet of paper. After this printing, the print mechanism 7 transmits the synchronous signal to the first and second VIFs 4-1 and 4-2 as above described. The first and second VIFs 4-1 and 4-2, which receive the synchronous signal, transmit image signals of the next line to the selection integration circuit 6 as long as there is an image signal not yet transmitted.

At S18, the MPU 2 waits until the first and second VIFs 4-1 and 4-2 transmit all image signals corresponding to print data (that is, the print mechanism 7 terminates the printing). When transmission of all image signals corresponding to print data is finished (when the print mechanism 7 finishes the printing), the MPU 2 terminates this control process.

In this way, according to the operational example 2, it is possible to divide print data received from the host computer into a plurality of parts according to a kind of image, and to execute an image process which differs for every divided part. Then, the print data to which respective image processes are applied are integrated into an image signal for one page and printed on a sheet of paper.

OPERATIONAL EXAMPLE 3

The operational example 3 shows a control process (action of the printer) executed in order to print data in the most suitable resolution when the print data including both text data and image data are transmitted.

Figure 6:
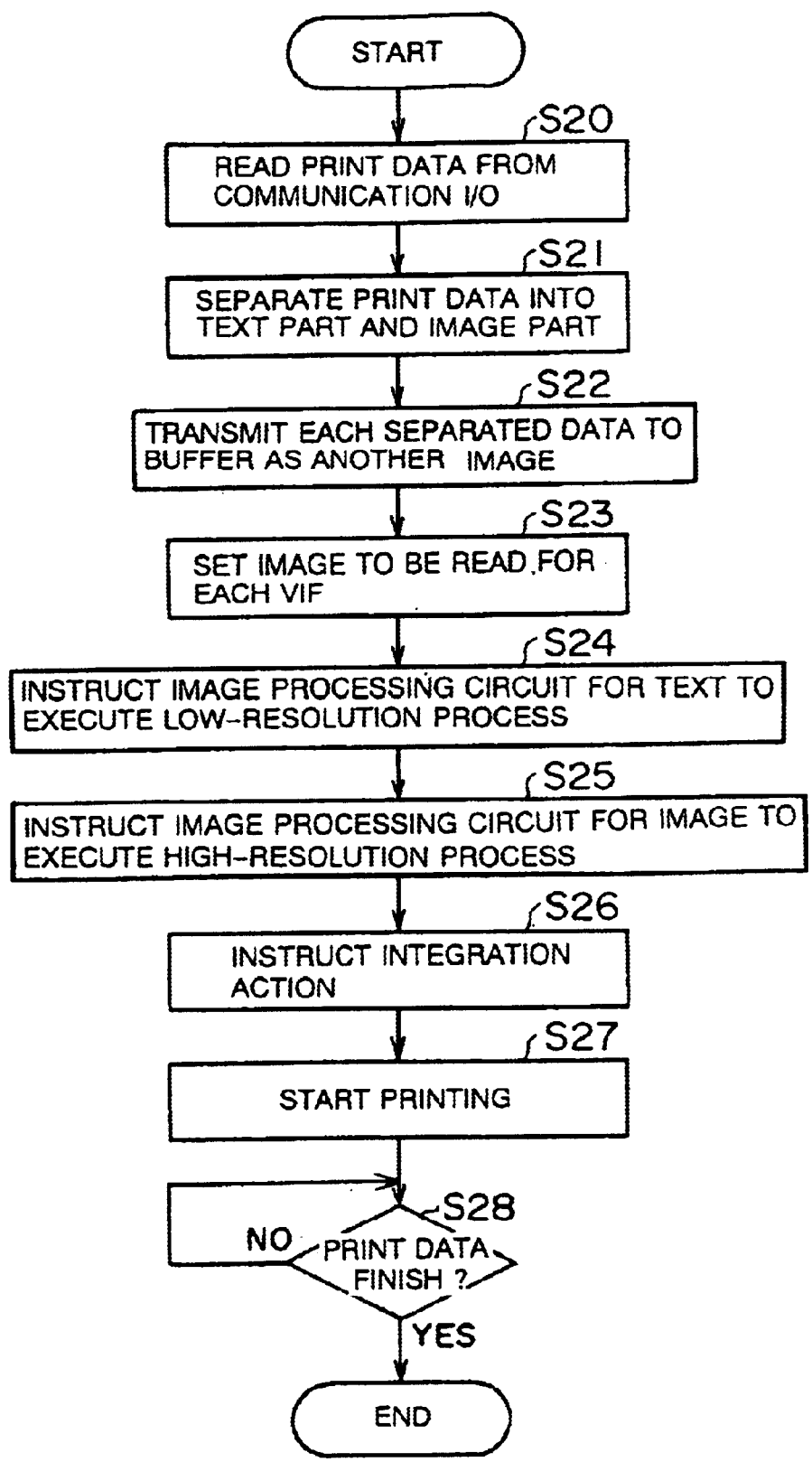
FIG. 6 is a flowchart showing a control process executed by the MPU 2 in operational Example 3.
Figure 7:
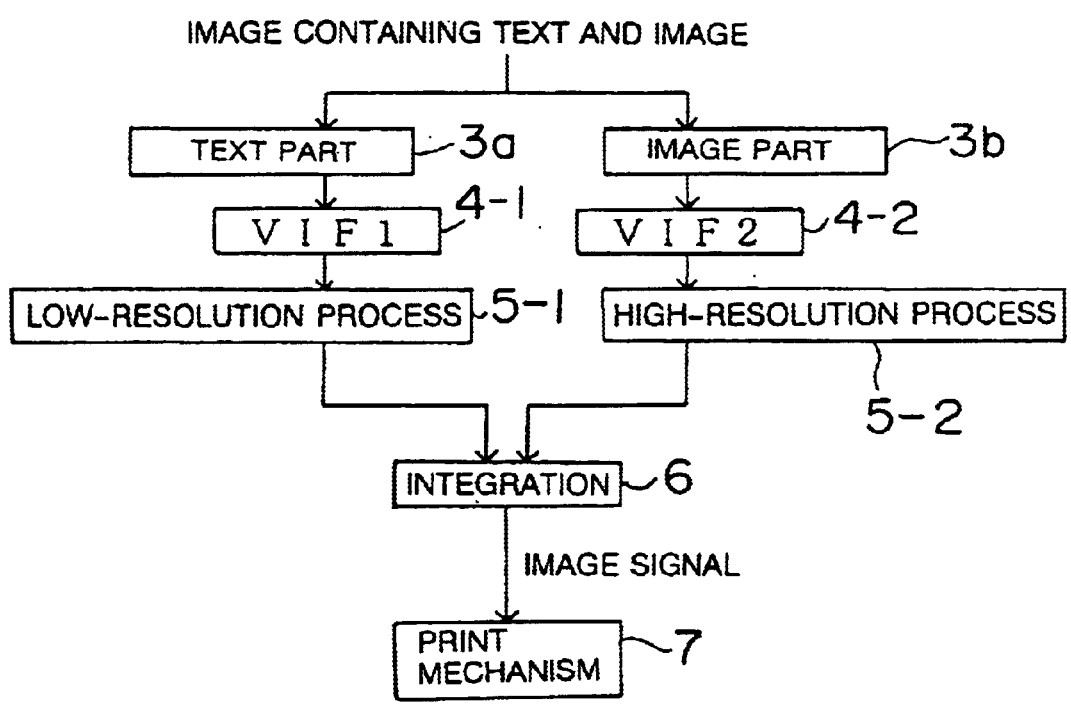
FIG. 7 is an explanatory view showing an operation of a printer in Operational Example 3.

FIG. 6 is a flowchart showing this control process, and FIG. 7 is an explanatory view showing an action in the printer when the MPU 2 executes the control process according to this flowchart.

The flowchart in FIG. 6 starts with the communication interface 1 receiving print data transmitted from the host computer (not shown). At S20, after starting, the MPU 2 reads print data from the communication interface 1.

At S21, the MPU 2 divides the print data read into print data corresponding to a text part (hereinafter, called "text print data") and print data corresponding to an image part (hereinafter, called "image print data") (equivalent to a separation unit).

At S22, the MPU 2 transmits the text print data and the image print data to the image buffer 3. At that time, the MPU 2, as shown in FIG. 7, stores the text print data in a position 3a indicated by the first address in the image buffer 3 (hereinafter, called "the first address position") and stores the image print data in a position 3b indicated by the second address in the image buffer 3 (hereinafter, called "the second address position") (equivalent to a storage unit).

At S23, the MPU 2 instructs the first VIF 4-1 to read print data from the first address position 3a in the image buffer 3, and instructs the second VIF 4-2 to read print data from the second address position 3b in the image buffer 3.

At S24, the MPU 2 instructs the first image processing circuit 5-1 for the text part to execute the low-resolution process.

At S25, the MPU 2 instructs the second image processing circuit 5-2 for the image part to execute the high-resolution process.

At S26, the MPU 2 instructs the selection integration circuit 6 to execute the integration action.

At S27, the MPU 2 instructs the first and second VIFs 4-1 and 4-2, the first and second image processing circuits 5-1 and 5-2, the selection integration circuit 6, and the print mechanism 7 to start the printing. The first VIF 4-1, when receiving this instruction, reads the text print data from the first address position 3a in the image buffer 3 and transmits image signals for several lines to the first image processing circuit 5-1. At the same time, the second VIF 4-2 reads the image print data from the second address position 3b in the image buffer 3 and transmits image signals for several lines to the second image processing circuit 5-2. The first image processing circuit 5-1, which receives the image signal, transmits the image signal to the selection integration circuit 6 after applying the low-resolution process to the image signal. The second image processing circuit 5-2, which receives the image signal, transmits the image signal to the selection integration circuit 6 after applying the high-resolution process to the image signal. The selection integration circuit 6 integrates image signals received from the first and second image processing circuits 5-1 and 5-2, and transmits the integrated image signal to the print mechanism 7. The print mechanism 7 prints the image corresponding to the image signal received from the selection integration circuit 6 on a sheet of paper. After this printing, the print mechanism 7 transmits the synchronous signal to the first and second VIFs 4-1 and 4-2 as described above. The first and second VIFs 4-1 and 4-2, which receive the synchronous signal, transmit image signals of the next line to the selection integration circuit 6 as long as there is an image signal not yet transmitted.

At S28, the MPU 2 waits until the first and second VIFs 4-1 and 4-2 transmit all image signals corresponding to print data (that is, until the printing by the print mechanism 7 is finished). The MPU 2 terminates this control process when transmission of all picture signals corresponding to print data terminates (that is, when the printing by the print mechanism 7 is finished).

In this way, according to the operational example, it is possible to divide the print data received from the host computer into a plurality of parts according to kinds of images, and to execute an image process which differs for every divided part. Then, the print data to which the respective image processes are applied are integrated into an image signal for one page, and printed on a piece of paper.

OPERATIONAL EXAMPLE 4

The operational example 4 shows a control process (action of the printer) executed in order to execute a decompression process corresponding to each compression method when compressed print data, including a text part to which the run-length compression process is applied and an image part to which the LZ compression process is applied, are transmitted.

Figure 8:
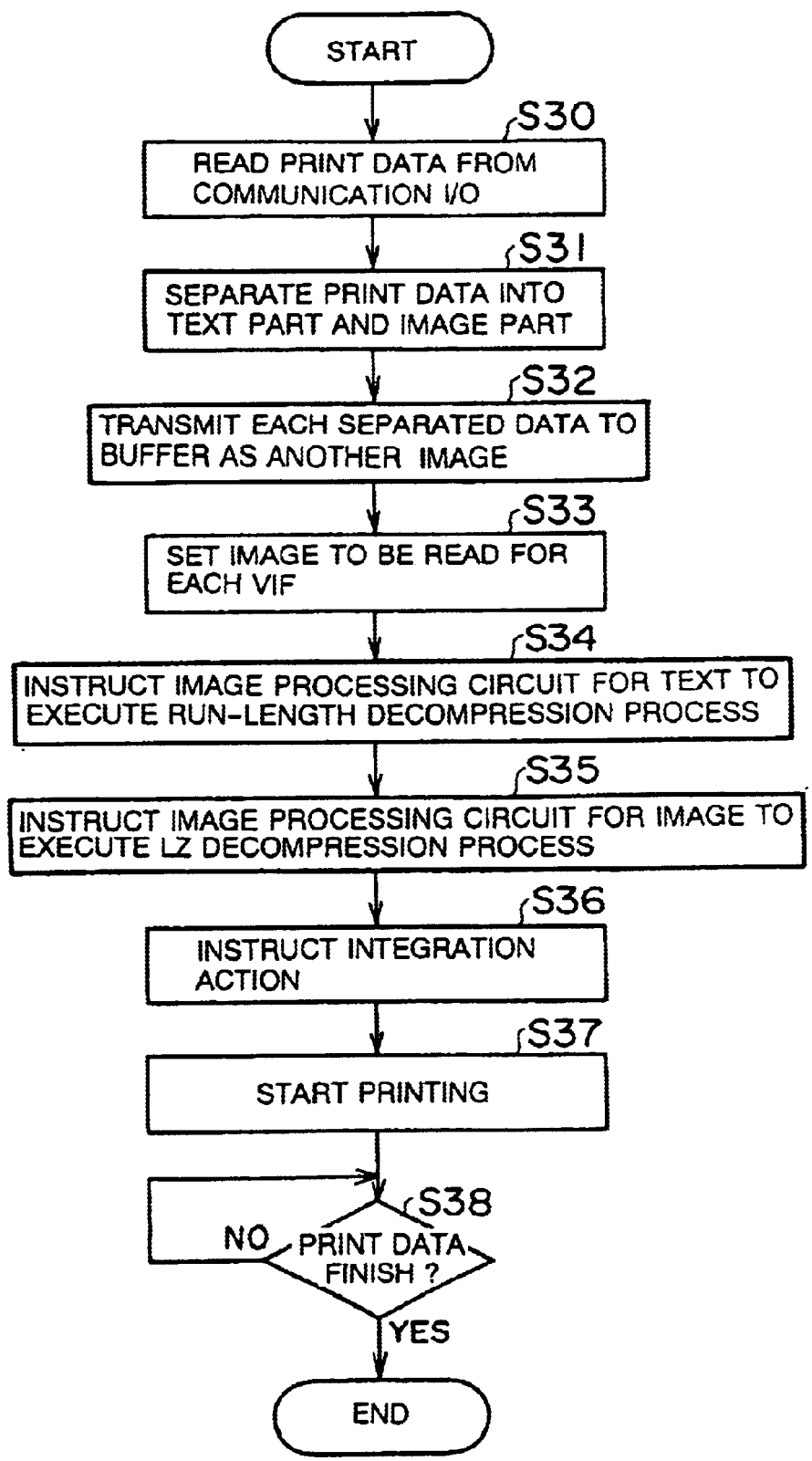
FIG. 8 is a flowchart showing a control process executed by the MPU 2 in Operational Example 4.
Figure 9:
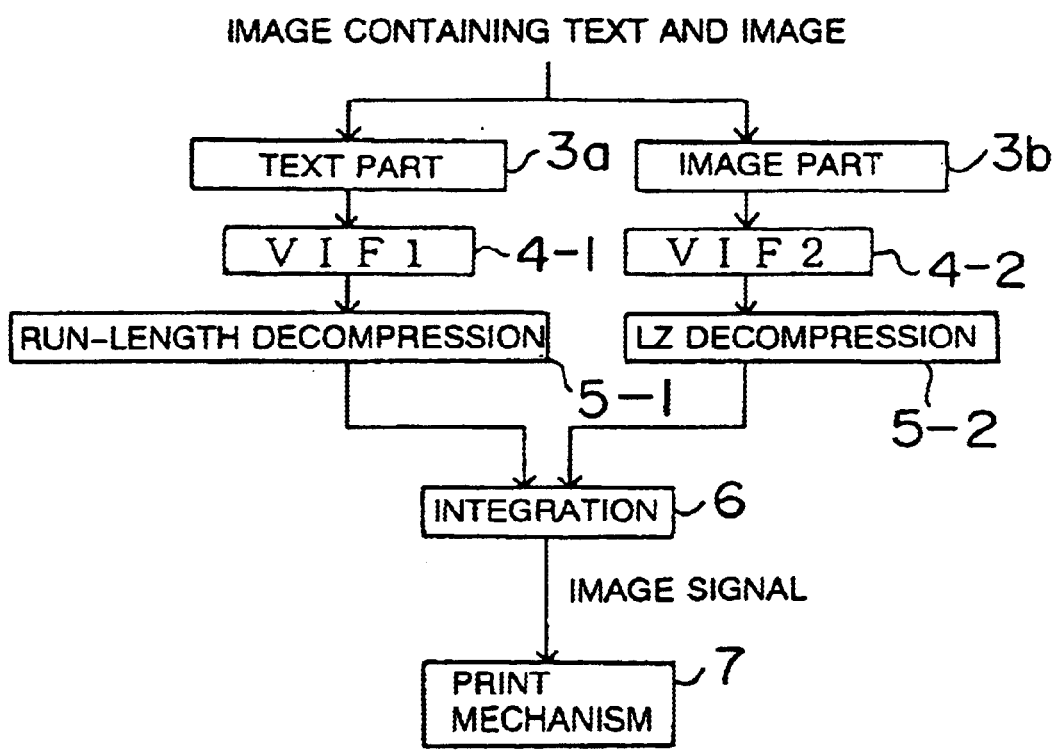
FIG. 9 is an explanatory view showing an operation of a printer in Operational Example 4.

FIG. 8 is a flowchart showing this control process, and FIG. 9 is an operational explanatory view showing an action in the printer when the MPU 2 executes the control process according to this flowchart.

The flowchart in FIG. 8 starts with the communication interface 1 receiving the compressed print data transmitted from the host computer not shown. At S30, after starting, the MPU 2 reads compressed print data from the communication interface 1.

At S31, the MPU 2 separates the compressed print data read into compressed print data corresponding to a text part (hereinafter, called "text compressed print data") and compressed print data corresponding to an image part (hereinafter, called "image compressed print data") (equivalent to a separation unit).

At S32, the MPU 2 transmits the compressed text print data and the compressed image print data to the image buffer 3. At that time, the MPU 2, as shown in FIG. 9, stores the compressed text print data in a position 3a indicated by the first address in the image buffer 3 (hereinafter, called "the first address position") and stores the compressed image print data in a position 3b indicated by the second address in the image buffer 3 (hereinafter, called "the second address position") (equivalent to a storage unit).

At S33, the MPU 2 instructs the first VIF 4-1 to read compressed print data from the first address position 3a in the image buffer 3, and instructs the second VIF 4-2 to read compressed print data from the second address position 3b in the image buffer 3.

At S34, the MPU 2 instructs the first image processing circuit 5-1 for the text part to execute the run-length decompression process.

At S35, the MPU 2 instructs the second image processing circuit 5-2 for the image part to execute the LZ decompression.

At S36, the MPU 2 instructs the selection integration circuit 6 to execute the integration process.

At S37, the MPU 2 instructs the first and second VIFs 4-1 and 4-2, the first and second image processing circuits 5-1 and 5-2, the selection integration circuit 6, and the print mechanism 7 to start printing. The first VIF 4-1, when receiving this instruction, reads the compressed text print data from the first address position 3a in the image buffer 3 and transmits the image signals for several lines to the image processing circuit 5-1. At the same time, the second VIF 4-2 reads the compressed image print data from the second address position 3b in the image buffer 3, and transmits the image signals for several lines to the second image processing circuit 5-2. The first image processing circuit 5-1, which receives an image signal, transmits it to the selection integration circuit 6 after applying the run-length decompression process to this image signal. On the other hand, the second image processing circuit 5-2, which receives an image signal, transmits it to the selection integration circuit 6 after applying the LZ decompression process to this image signal. The selection integration circuit 6 integrates image signals received from the first and second image processing circuits 5-1 and 5-2, and transmits the integrated image signal to the print mechanism 7. The print mechanism 7 prints the image corresponding to the image signal received from the selection integration circuit 6 on a sheet of paper. After this printing, the print mechanism 7 transmits the synchronous signal to the first and second VIFs 4-1 and 4-2 as above described. The first and second VIFs 4-1 and 4-2, which receive the synchronous signal, transmit an image signal of the next line to the selection integration circuit 6 as long as there is an image signal not yet transmitted.

At S38, the MPU 2 waits until the first and second VIFs 4-1 and 4-2 transmit all image signals corresponding to print data (that is, the printing by the print mechanism 7 is finished). Then, the MPU 2 terminates this control process when transmission of all image signals corresponding to print data is finished (that is, when the printing by the print mechanism 7 is finished).

In this way, according to the operational example 4, though print data, including various images of which properties are different from one another in one page, are transmitted to a printer, the print data are divided into a plurality of parts according to the properties of the images and are compressed by suitable processes according to the properties of the images in the respective parts, whereby it becomes possible to make a size of print data smaller and to transmit the small print data to a printer. Accordingly, it is possible to shorten a time necessary for transmission of the print data. In the printer, the print data are divided for every property, and independently stored in the image buffer 3. Then, a decompression process corresponding to the compression process applied to each part by each image processing circuit 5 is applied to each part, whereby an original image is restored. Thereafter, the restored images are integrated into an image for one page, and printed on a sheet of paper.

OPERATIONAL EXAMPLE 5

The operational example 5 shows a control process (action of the printer) executed when print data (hereinafter, called "band print data") obtained by dividing print data for one page for every band in order to execute the band printing, are transmitted from host computer not shown.

Figure 10:
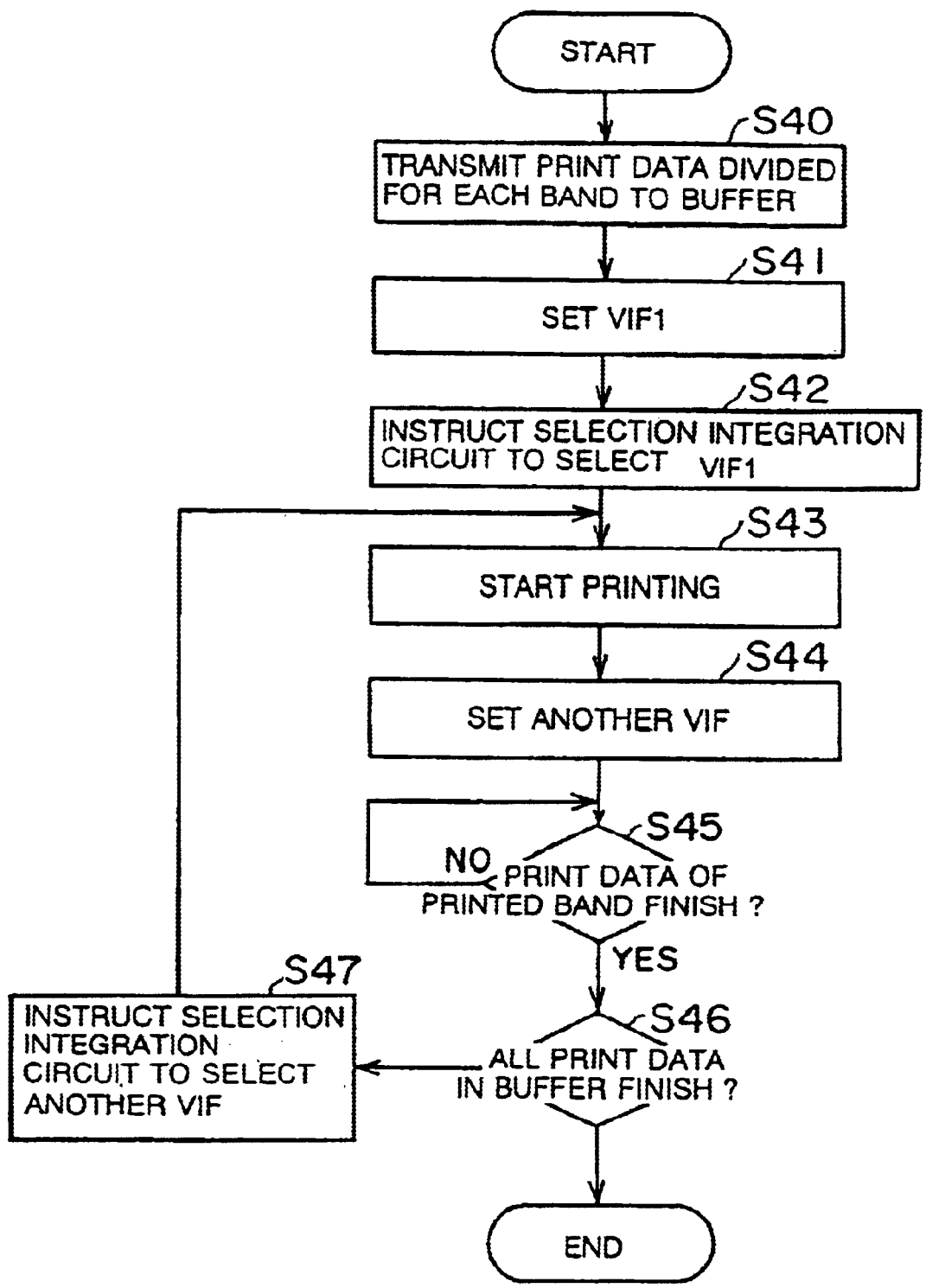
FIG. 10 is a flowchart showing a control process executed by the MPU 2 in operational Example 5.
Figure 11:
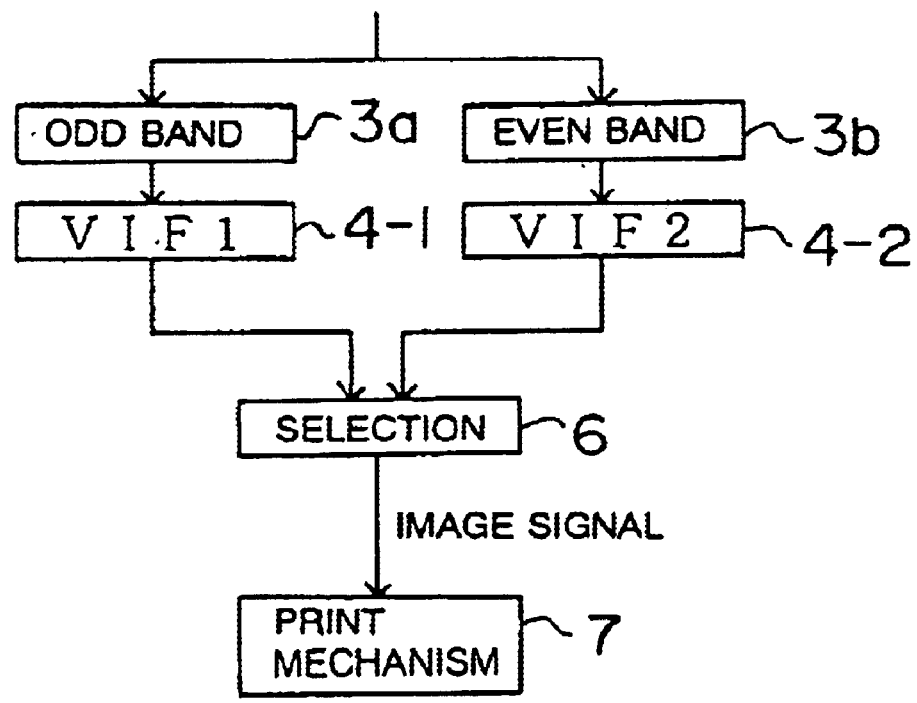
FIG. 11 is an explanatory view showing an operation of a printer in Operational Example 5.

FIG. 10 is a flowchart showing this control process, and FIG. 11 is an operational explanatory view showing an action in the printer when the MPU 2 executes the control process according to this flowchart.

The flowchart in FIG. 10 starts with the communication interface 1 receiving the first band print data transmitted from the host computer (not shown). At S40, after starting, the MPU 2 starts the transmission of the band print data from the communication interface 1 to the image buffer 3. Then, the MPU 2 transmits the received band print data to the image buffer 3 by an interrupt whenever the communication interface 1 receives new band print data. At that time, the MPU 2 independently stores each band print data in any space area in the image buffer 3 (including storage areas of print data already read into the VIF 4).

At S41, the MPU 2 instructs the first VIF 4-1 to read the first band print data stored in the image buffer 3.

At S42, the MPU 2 instructs the selection integration circuit 6 to execute the selection action. Concretely, it is instructed to select the image signal transmitted from the first VIF 4-1.

Figure 12:
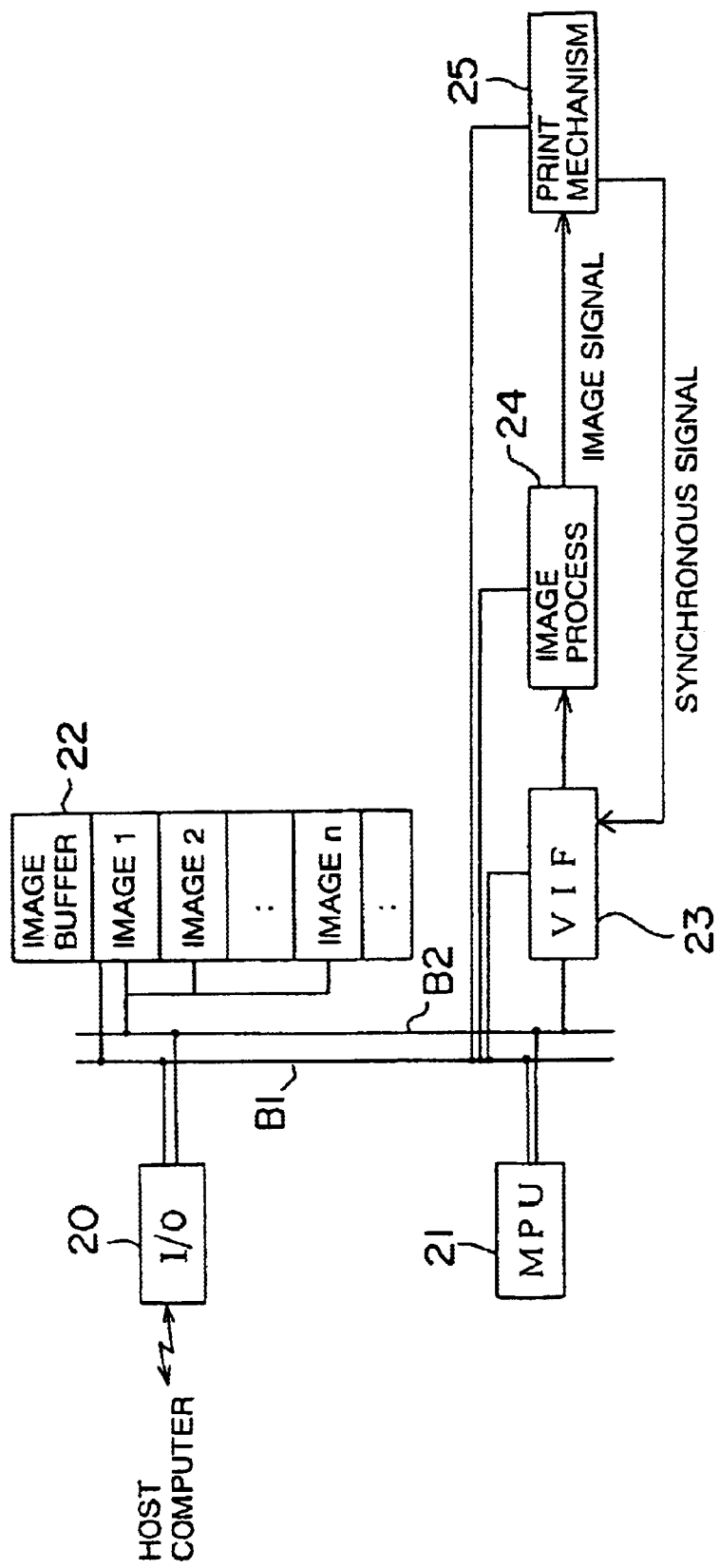
FIG. 12 is a block diagram showing a configuration of a control circuit in a conventional printer.

Next, the MPU 2 executes a loop process at S43 through S47 in order to execute the printing corresponding to each band print data. At S43, after entering the loop process, the MPU 2 instructs the selection integration circuit 6, the VIF 4 selected by the selection integration circuit 6 (the first VIF 4-1 when a number of times the loop process is executed is odd, and the second VIF 4-2 when a number of times the loop process is executed is even), the image processing circuit 5 selected by the selection integration circuit 6 (the first image processing circuit 5-1 when a number of times the loop process is executed is odd, and the second image processing circuit 5-2 when a number of times the loop process is executed is even), and the print mechanism 7 to start a printing. When the number of times the loop process is executed is odd, the first VIF 4-1 receiving the instruction of printing start, as shown in FIG. 11, reads odd-numbered band print data and transmits image data for several lines to the selection integration circuit 6 through the image processing circuit 5-1. When the number of times the loop process is executed is even, as shown in FIG. 12, the second VIF 4-2, which receives the instruction of printing start, reads even-numbered band printing data and transmits image signals for several lines to the selection integration circuit 6 through the second image processing circuit 5-2. The selection integration circuit 6, when the number of times the loop process is executed is odd, selects the image signals received through the first image processing circuit 5-1 and transmits them to the print mechanism 7, and when the number of times the loop process is executed is even, selects the image signals received through the second image processing circuit 5-2 and transmits them to the print mechanism 7. The print mechanism 7 prints an image corresponding to the image signal received from the selection integration circuit 6 on a sheet of paper. After this printing, the print mechanism 7 transmits the synchronous signal to the first VIF 4-1 when the number of times the loop process is executed is odd, and the synchronous signal is transmitted to the second VIF 4-2 when the number of times the loop process is executed is even. The first VIF 4-1 or the second VIF 4-2, which receives the synchronous signal, transmits an image signal of the next line to the selection integration circuit 6 as long as there is an image signal not yet transmitted.

At S44, the MPU 2 instructs the other VIF 4 (the second VIF 4-2 when the number of times the loop process is executed is odd, and the first VIF 4-1 when the number of times the loop process is executed is even) to read the next band print data stored in the image buffer.

At S45, the MPU 2 waits until the VIF 4 transmitting image signals terminates transmission of all image signals corresponding to each band print data. Then, the MPU 2 advances the process to S46 when the transmission of all image signals corresponding to each band print data terminates.

At S46, the MPU 2 checks whether all band printing data stored in the buffer 3 are completely read. The MPU 2 returns the process to S43 after instructing the selection integration circuit 6 to select the image signal transmitted from the other VIF 4 at S47 when all band print data are not completely read.

The MPU 2 terminates this control process when all band print data stored in the buffer 3 are completely read.

In this way, according to the operational example 5, two VIFs 4 are alternatively assigned every band in order to execute the band printing. Accordingly, while one VIF 4 acts, the other VIF 4 stops; therefore, it is possible to set the stopped VIF by taking a sufficient time without effecting the acting VIF 4. Then, the other VIF 4 promptly inherits the process when the acting VIF 4 stops after finishing the transmission of image signals. As a result, there is no case wherein the printed image breaks off.

As explained in each operational example, the printer of this embodiment is provided with a plurality of VIFs 4 and image processing circuits 5; therefore, it is possible to independently store a plurality of print data for printing an image for one page in the image buffer 3 and to integrate them into a piece of print data for one page by the selection integration circuit 6, thereby printing the image on one page.

As described above, according to the printer of the present invention, it is possible to independently process a plurality of print data, each of the print data corresponding to each part to be an image printed on one page, and to print the image on one page based on these print data.

This invention being thus described, it will be obvious that same may be varied in various ways. Such variations are not to be regarded as departures from the spirit and scope of the invention, and all such modifications would be obvious for one skilled in the art and intended to be included within the scope of the following claims.

What is claimed is:

1. A printer receiving and printing print data on one page, the print data being received from a host computer and comprising a plurality of different types of data, the printer comprising:
   a separation unit separating the print data into separate sets of data according to the different types of data;
   an image buffer having a plurality of storage locations, each storage location storing one type of data;
   a storage unit storing each separate set of data in a different one of the storage locations of the image buffer;
   a plurality of video interfaces independently reading a respective one of the separate sets of data stored in a corresponding storage location of the image buffer;
   a print data integration circuit integrating the separate sets of data read by the video interfaces;
   an output mechanism outputting the integrated print data on one page; and
   a plurality of image processing circuits, each of the image processing circuits applying an image process to the separate set of data read by a corresponding one of the video interfaces,
   wherein the image process applied by each of the image processing circuits is respectively one of a smoothing process, an intermediate tone process, a low-resolution process, a high-resolution process, a run-length decompression process, and a Lempel-Ziv (LZ) decompression process.

2. A printer receiving and printing print data on one page, the print data being received from a host computer and comprising a plurality of different types of data, the printer comprising:
   a separation unit separating the print data into separate sets of data according to the different types of data;
   an image buffer having a plurality of storage locations, each storage location storing one type of data;
   a storage unit storing each separate set of data in a different one of the storage locations of the image buffer;
   a plurality of video interfaces independently reading a respective one of the separate sets of data stored in a corresponding storage location of the image buffer;
   a print data integration circuit integrating the separate sets of data read by the video interfaces; and
   an output mechanism outputting the integrated print data on one page,
   wherein the plurality of separate sets of data stored in the image buffer are obtained by dividing the print data to be printed on one page into a plurality of bands, each of the bands corresponding to one of the different types of data, and wherein the print data integration circuit alternately selects the separate set of data read by each of the video interfaces and outputs the selected set of data to the output mechanism.

3. A controller controlling a printer to output print data on one page, the print data being received from a host computer and comprising a plurality of different types of data, the controller comprising:
   a separation unit separating the print data into separate sets of data according to the different types of data;
   a storage unit storing each separate set of data in a different one of a plurality of storage locations of an image buffer according to the different types of data;
   a plurality of video interfaces independently reading a respective one of the separate sets of data stored in a corresponding one of the plurality of storage locations of the image buffer;
   a print data integration circuit integrating the separate sets of data read by the video interfaces; and a plurality of image processing circuits, each of the image processing circuits applying an image process to the separate set of data read by a corresponding one of the video interfaces,
   wherein the image process applied by each of the image processing circuits is respectively one of a smoothing process, an intermediate tone process, a low-resolution process, a high-resolution process, a run-length decompression process, and a Lempel-Ziv (LZ) decompression process.

4. A controller controlling a printer to output print data on one page, the print data being received from a host computer and comprising a plurality of different types of data, the controller comprising:
   a separation unit separating the print data into separate sets of data according to the different types of data;
   a storage unit storing each separate set of data in a different one of a plurality of storage locations of an image buffer according to the different types of data;
   a plurality of video interfaces independently reading a respective one of the separate sets of data stored in a corresponding one of the plurality of storage locations of the image buffer; and
   a print data integration circuit integrating the separate sets of data read by the video interfaces,
   wherein the plurality of separate sets of data stored in the image buffer are obtained by dividing the print data to be printed on one page into a plurality of bands, each of the bands corresponding to one of the different types of data, and wherein the print data integration circuit alternately selects the separate set of data read by each of the video interfaces and outputs the selected set of data to the output mechanism.

5. A method of processing print data to be printed on one page, the print data being received from a host computer and comprising a plurality of different types of data, the method comprising:
   separating the print data into separate sets of data according to the different types of data;
   storing each separate set of data in a different storage location;
   reading each one of the separate sets of data;
   integrating the separate sets of data read;
   applying a different image process to each one of the read separate sets of data; and
   outputting the integrated print data on one page,
   wherein the image process applied is respectively one of a smoothing process, an intermediate tone process, a low-resolution process, a high-resolution process, a run-length decompression process, and a Lempel-Ziv (LZ) decompression process.

6. An image forming apparatus receiving and forming form data on one page, the form data being received from a host computer and comprising a plurality of different types of data, the image forming apparatus comprising:
   a separation unit separating the form data into separate sets of data according to the different types of data;
   an image buffer having a plurality of storage locations, each storage location storing one type of data;

a storage unit storing each separate set of data in a different one of the storage locations of the image buffer;

a plurality of video interfaces independently reading a respective one of the separate sets of data stored in a corresponding storage location of the image buffer;

a form data integration circuit integrating the separate sets of data read by the video interfaces;

an output mechanism outputting the integrated form data on one page; and a plurality of image processing circuits, each of the image processing circuits applying an image process to the separate set of data read by a corresponding one of the video interfaces, wherein the image process applied by each of the image processing circuits is respectively one of a smoothing process, an intermediate tone process, a low-resolution process, a high-resolution process, a run-length decompression process, and a Lempel-Ziv (LZ) decompression process.

7. An image forming apparatus receiving and forming form data on one page, the form data being received from a host computer and comprising a plurality of different types of data, the image forming apparatus comprising:

a separation unit separating the form data into separate sets of data according to the different types of data;

an image buffer having a plurality of storage locations, each storage location storing one type of data;

a storage unit storing each separate set of data in a different one of the storage locations of the image buffer;

a plurality of video interfaces independently reading a respective one of the separate sets of data stored in a corresponding storage location of the image buffer;

a form data integration circuit integrating the separate sets of data read by the video interfaces; and an output mechanism outputting the integrated form data on one page, wherein the plurality of separate sets of data stored in the image buffer are obtained by dividing the form data to be formed on one page into a plurality of bands, each of the bands corresponding to one of the different types of data, and wherein the form data integration circuit alternately selects the separate set of data read by each of the video interfaces and outputs the selected set of data to the output mechanism.

8. A controller controlling an image forming apparatus to output form data on one page, the form data being received from a host computer and comprising a plurality of different types of data, the controller comprising:

a separation unit separating the form data into separate sets of data according to the different types of data;

a storage unit storing each separate set of data in a different one of a plurality of storage locations of an image buffer according to the different types of data;

a plurality of video interfaces independently reading a respective one of the separate sets of data stored in a corresponding one of the plurality of storage locations of the image buffer;

a form data integration circuit integrating the separate sets of data read by the video interfaces; and a plurality of image processing circuits, each of the image processing circuits applying an image process to the separate set of data read by a corresponding one of the video interfaces, wherein the image process applied by each of the image processing circuits is respectively one of a smoothing process, an intermediate tone process, a low-resolution process, a high-resolution process, a run-length decompression process, and a Lempel-Ziv (LZ) decompression process.

9. A controller controlling an image forming apparatus to output form data on one page, the form data being received from a host computer and comprising a plurality of different types of data, the controller comprising:

a separation unit separating the form data into separate sets of data according to the different types of data;

a storage unit storing each separate set of data in a different one of a plurality of storage locations of an image buffer according to the different types of data;

a plurality of video interfaces independently reading a respective one of the separate sets of data stored in a corresponding one of the plurality of storage locations of the image buffer; and a form data integration circuit integrating the separate sets of data read by the video interfaces, wherein the plurality of separate sets of data stored in the image buffer are obtained by dividing the form data to be formed on one page into a plurality of bands, each of the bands corresponding to one of the different types of data, and wherein the form data integration circuit alternately selects the separate set of data read by each of the video interfaces and outputs the selected set of data to the output mechanism.

10. A method of processing form data to be formed on one page, the form data being received from a host computer and comprising a plurality of different types of data, the method comprising:

separating the form data into separate sets of data according to the different types of data;

storing each separate set of data in a different storage location;

reading each one of the separate sets of data;

applying a different image process to each one of the read separate sets of data; and outputting the processed form data on one page, wherein the image process applied is respectively one of a smoothing process, an intermediate tone process, a low-resolution process, a high-resolution process, a run-length decompression process, and a Lempel-Ziv (LZ) decompression process.

* * * * *

UNITED STATES PATENT AND TRADEMARK OFFICE
CERTIFICATE OF CORRECTION

| | | |
|---|---|---|
| PATENT NO. | : 6,914,697 B2 | Page 1 of 1 |
| APPLICATION NO. | : 09/138378 | |
| DATED | : July 5, 2005 | |
| INVENTOR(S) | : Shigeki Hamura et al. | |

It is certified that error appears in the above-identified patent and that said Letters Patent is hereby corrected as shown below:

On Title page; (56) OTHER PUBLICATIONS, Column 2, line 16, replace "mailed June 11, 2002" with --mailed October 16, 2001--.

Signed and Sealed this

Seventeenth Day of October, 2006

JON W. DUDAS
*Director of the United States Patent and Trademark Office*

UNITED STATES PATENT AND TRADEMARK OFFICE
CERTIFICATE OF CORRECTION

PATENT NO. : 6,914,697 B2
APPLICATION NO. : 09/138378
DATED : July 5, 2005
INVENTOR(S) : Shigeki Hamura et al.

It is certified that error appears in the above-identified patent and that said Letters Patent is hereby corrected as shown below:

On Title Page, Item (56) OTHER PUBLICATIONS, Column 2, between lines 16 and 17 please ADD -- Notice of Reasons for Rejection for related Japanese Patent Application No. 9-301897 mailed June 11, 2002--.

Signed and Sealed this

Third Day of April, 2007

JON W. DUDAS
*Director of the United States Patent and Trademark Office*